(12) United States Patent
Harp

(10) Patent No.: US 11,945,484 B2
(45) Date of Patent: Apr. 2, 2024

(54) SHUNT FREQUENCY CHECK AND TRANSMIT SYSTEM

(71) Applicant: Siemens Mobility, Inc., New York, NY (US)

(72) Inventor: Brian Harp, New Albany, IN (US)

(73) Assignee: SIEMENS MOBILITY, INC., New York, NY (US)

( * ) Notice: Subject to any disclaimer, the term of this patent is extended or adjusted under 35 U.S.C. 154(b) by 808 days.

(21) Appl. No.: 17/051,566

(22) PCT Filed: Jul. 5, 2018

(86) PCT No.: PCT/US2018/040838
§ 371 (c)(1),
(2) Date: Oct. 29, 2020

(87) PCT Pub. No.: WO2019/216928
PCT Pub. Date: Nov. 14, 2019

(65) Prior Publication Data
US 2021/0086810 A1    Mar. 25, 2021

(30) Foreign Application Priority Data
May 10, 2018  (WO) ................ PCT/US2018/031936

(51) Int. Cl.
*B61L 29/22* (2006.01)
*H02J 7/00* (2006.01)

(52) U.S. Cl.
CPC .......... *B61L 29/226* (2013.01); *H02J 7/0042* (2013.01)

(58) Field of Classification Search
CPC .......... B61L 29/00; B61L 29/18; B61L 29/22; B61L 29/222; B61L 29/224; B61L 29/226; B61L 27/00; B61L 27/40; H02J 7/0042
See application file for complete search history.

(56) References Cited

U.S. PATENT DOCUMENTS

| 5,029,780 A | 7/1991 | Peel |
| 7,155,358 B2 | 12/2006 | Bamfield et al. |
| 7,671,846 B1 | 3/2010 | Komata |

FOREIGN PATENT DOCUMENTS

| WO | 2014143722 A2 | 9/2014 | |
| WO | WO-2014143722 A2 * | 9/2014 | .............. B61L 1/187 |

OTHER PUBLICATIONS

PCT International Search Report and Written Opinion of International Searching Authority dated Apr. 8, 2019 corresponding to PCT International Application No. PCT/US2018/040838 filed Jul. 5, 2018.

* cited by examiner

*Primary Examiner* — Robert J McCarry, Jr.

(57) ABSTRACT

To locate a shunt, the shunt includes an RF transmitter configured to wirelessly transmit an identifier of the shunt such as the configured shunt frequency. The shunt may include switches or memory locations that may be configured by an installer to correspond to the configured shunt frequency. Other embodiments employ switches or sensors influenced by jumpers installed in the shunt to configure the frequency of the shunt. A portable device receives a transmission including the identifier and displays it along with an indication of the received signal strength of the transmission, and maintenance personnel move the portable device along the track to locate the highest received signal strength, which indicates the location of the shunt. The shunt may also include a test circuit that may be configurable to generate a test frequency, determine a parameter indicative of shunt performance, and output a signal based on the parameter.

17 Claims, 8 Drawing Sheets

SHUNT FREQUENCY CHECK AND TRANSMIT SYSTEM

BACKGROUND

This disclosure is directed toward control systems and methods for railway grade, or level, crossings. A railway grade crossing warning system is typically comprised of a train detection system coupled with a crossing control system to provide appropriate warning to the road users, usually by means of flashing lights, barrier gates and bells. Recorders are also typically deployed to monitor the train detection and crossing control equipment. Such recorders are also of assistance in incident investigation and in equipment troubleshooting.

The train detection system may comprise a track circuit based upon fail-safe design principles. The track circuit may include a transmitter, the rails of the track, a receiver, and one or more special shunts placed at the ends of the track circuit approach(es). An interruption or disturbance in the circuitry or in the signals impressed on the rails to detect trains will activate the crossing warning devices. The shunts may be tuned AC circuits configured to shunt the particular frequency transmitted by the transmitter. These shunts may be buried in the gravel ballast of the track bed in a manner that they are not visible, which may make locating them, for maintenance or other reasons, problematic. Additionally, because components in the shunts and components in the other devices in the track circuit sometimes fail, it sometimes becomes desirable to test the shunt to determine if it is properly shunting (i.e., passing) the desired frequency at a sufficiently low level of attenuation.

DETAILED DESCRIPTION

Figure 1:
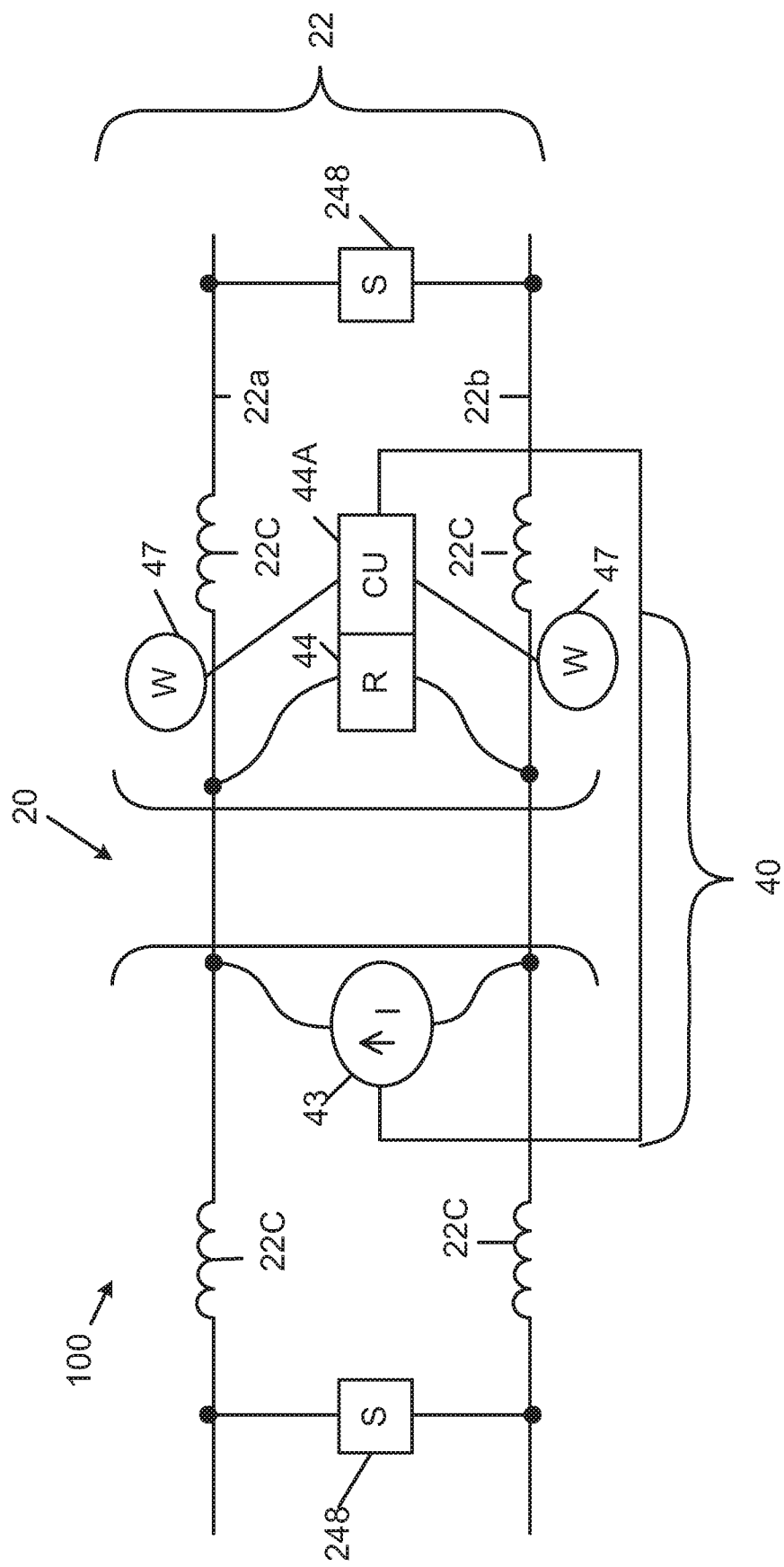
FIG. 1 is a schematic diagram illustrating a highway-rail grade crossing warning system at a grade crossing.

FIG. 1 illustrates a schematic view of a typical grade crossing warning system 100 at a location in which a road 20 crosses train track 22. The train track 22 includes two rails 22*a*, 22*b* and a plurality of ties (not shown in FIG. 1) that support the rails. The rails 22*a,b* are shown as including inductors 22*c*. The inductors 22*c* are not separate physical devices but rather are shown to illustrate the inherent distributed inductance of the rails 22*a,b*. This inductance is typically taken to be 0.5 mH per 1000 feet of rail. A track circuit 40 may comprise a transmitter 43 connected across the rails 22*a,b* on one side of the road 20 and a receiver 44 connected across the rails 22*a,b* on the other side of the road 20. Although the transmitter 43 and receiver 44 are connected on opposite sides of the road 20, those of skill in the art will recognize that the components of the transmitter 43 and receiver 44 other than the physical conductors that connect to the track are often co-located in an enclosure (which is sometimes referred to in the railroad industry as a bungalow) located on one side of the road 20. The transmitter 43 and receiver 44 may also be connected to a control unit 44*a*, which may also be located in the aforementioned enclosure. The control unit 44*a* may be connected, and may include logic, for controlling warning devices 47 at the crossing 20. The control unit 44*a* may also include logic (which may be implemented in hardware, software, or a combination thereof) for calculating train speed and constant warning time signals for controlling the warning devices 47. Also shown in FIG. 1 are a pair of shunts 248, one on each side of the road 20 at a desired approach distance. The shunts 248 may be simple conductors, or may be tuned circuit AC circuits configured to shunt the particular frequency being transmitted by the transmitter 43. A frequency selectable shunt is disclosed in U.S. Pat. No. 5,029,780, the entire contents of which are hereby incorporated herein by reference. The transmitter 43 may be configured to transmit a constant current AC signal at a particular frequency, which may be in the audio frequency range, such as 50 Hz-1000 Hz. The receiver 44 may measure the voltage across the rails 22*a,b*, which (because the transmitter 43 generates a constant current) is indicative of the impedance and hence the inductance of the circuit formed by the rails 22 *a,b* and shunts 248.

If a train heading toward the road 20 crosses one of the shunts 48, the train's wheels and axles may act as shunts which essentially shorten the length of the rails 22*a,b*, thereby lowering the inductance and hence the impedance and voltage. Measuring the change in the impedance indicates the distance of the train, and measuring the rate of change of the impedance (or integrating the impedance over time) allows the speed of the train to be determined. As a train moves toward the road 20 from either direction, the impedance of the circuit will decrease, whereas the impedance will increase as the train moves away from the receiver 44/transmitter 43 toward the shunts 248. Thus, control unit 44*a* is able to determine whether the train is inbound or outbound with respect to the road 20, but cannot determine on which side of the road 20 the train is located.

As discussed above, the shunts 248 may be installed in the gravel ballast of the railroad track. For security purposes, these shunts may be completed covered with the gravel ballast and only the connecting wires are visible. In northern areas, snow often makes it difficult to find the connecting wires, making the shunt difficult to find. The same is true of mud. If there are multiple crossings in a given section of track, multiple shunts may be present and located in close proximity to each other, and there is no way to determine which shunt belongs to a specific crossing without digging the shunt out of the ballast. During a reported maintenance call, the longer it takes for maintenance personnel to locate a particular shunt, the longer the affected crossing is out of service, and the longer maintenance personnel will be exposed to increased risk of being struck by a train or other track vehicle due to the need to be within the gauge of track in order to locate the shunt. Current methods of marking shunt location include mechanical means such as marker posts or painting a railroad tie adjacent to the shunt. These solutions have problems, including the possibility of being obscured by snow or mud and also compromising the security of the shunts by indicating their location to third parties such as vandals.

In order to facilitate locating a desired shunt, a radio transmitter may be included with the shunt. The transmitter may be controlled to transmit periodic or continuous short bursts with an identifier of the shunt, such as the serial number and/or type of the shunt. In other embodiments, the transmitter may be a transceiver, and may be controlled to listen for a query and respond to a received query by transmitting the identifier. The transmitter may also transmit the nominal frequency to which the shunt is tuned along with the identifier.

Figure 2:
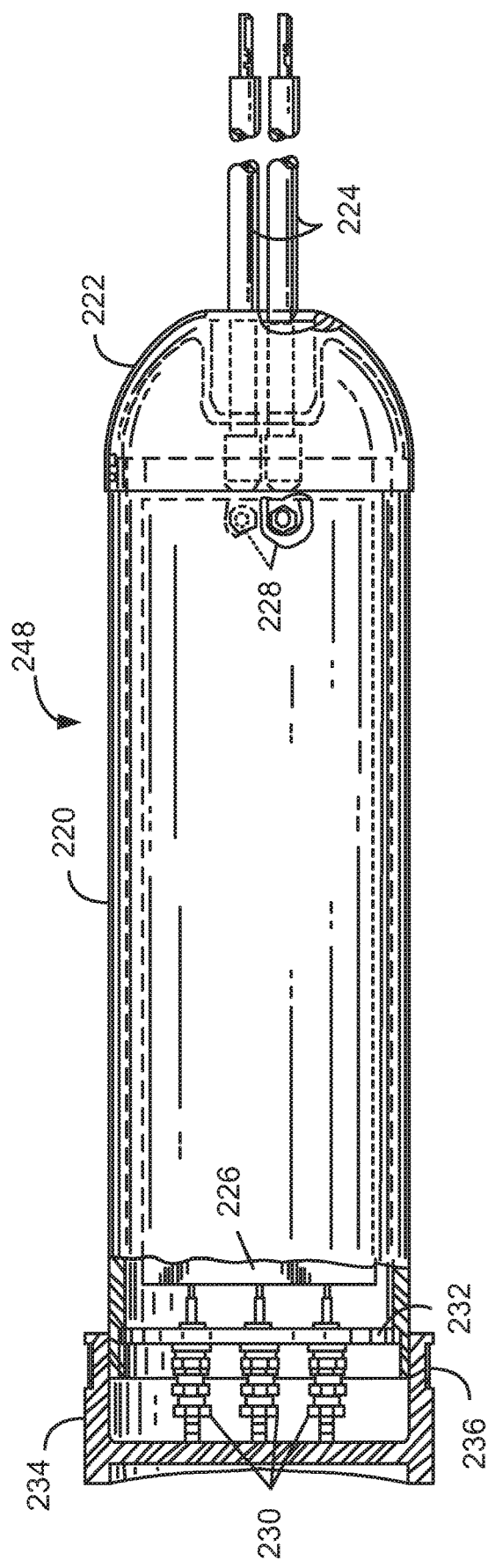
FIG. 2 is a perspective view of a shunt according to one embodiment.

FIG. 2 illustrates a shunt 248 according to one embodiment. The shunt 248 includes an outer housing 220 which has a cap 222 at one end through which extends a pair of electrical wire connectors 224, each of which will be connected to one of the rails of a respective section of track.

Within housing 220 there is a printed circuit board 226 which has a pair of rail terminals 228 at one end which terminals are connected to wire connectors 224. As will be described in connection with FIGS. 4, 5 and 6. PC board 226 mounts a network of a plurality of inductors and capacitors which are used to determine the nominal frequency of the shunt 248. These elements are connected to a plurality of header terminals 230 each of which are mounted on a header board 232 positioned in one end of housing 220. Header terminals 30 are enclosed by a cover 234 which may be formed of a rubber or rubberlike material so as to seal the interior of housing 220 from the elements. Cover 234 is held in place on the open end of housing 220 by a removable strap 236.

In use, the shunt 248 may be buried in the ballast between the rails and connectors 224 may be connected to adjacent rails. Jumpers may be used to connect certain designated header terminals which will determine the nominal frequency of the shunt. Once the shunt 248 is fixed in place between the rails, if it is necessary to change the frequency of the shunt 248, strap 236 is removed, as is cover 234, permitting access to header terminals 230. The jumpers on the terminals 230 are changed so as to provide whatever frequency is desired for the shunt 248. The cover 234 and strap 236 are then replaced so that the shunt 248 is again sealed from the elements.

Figure 3:
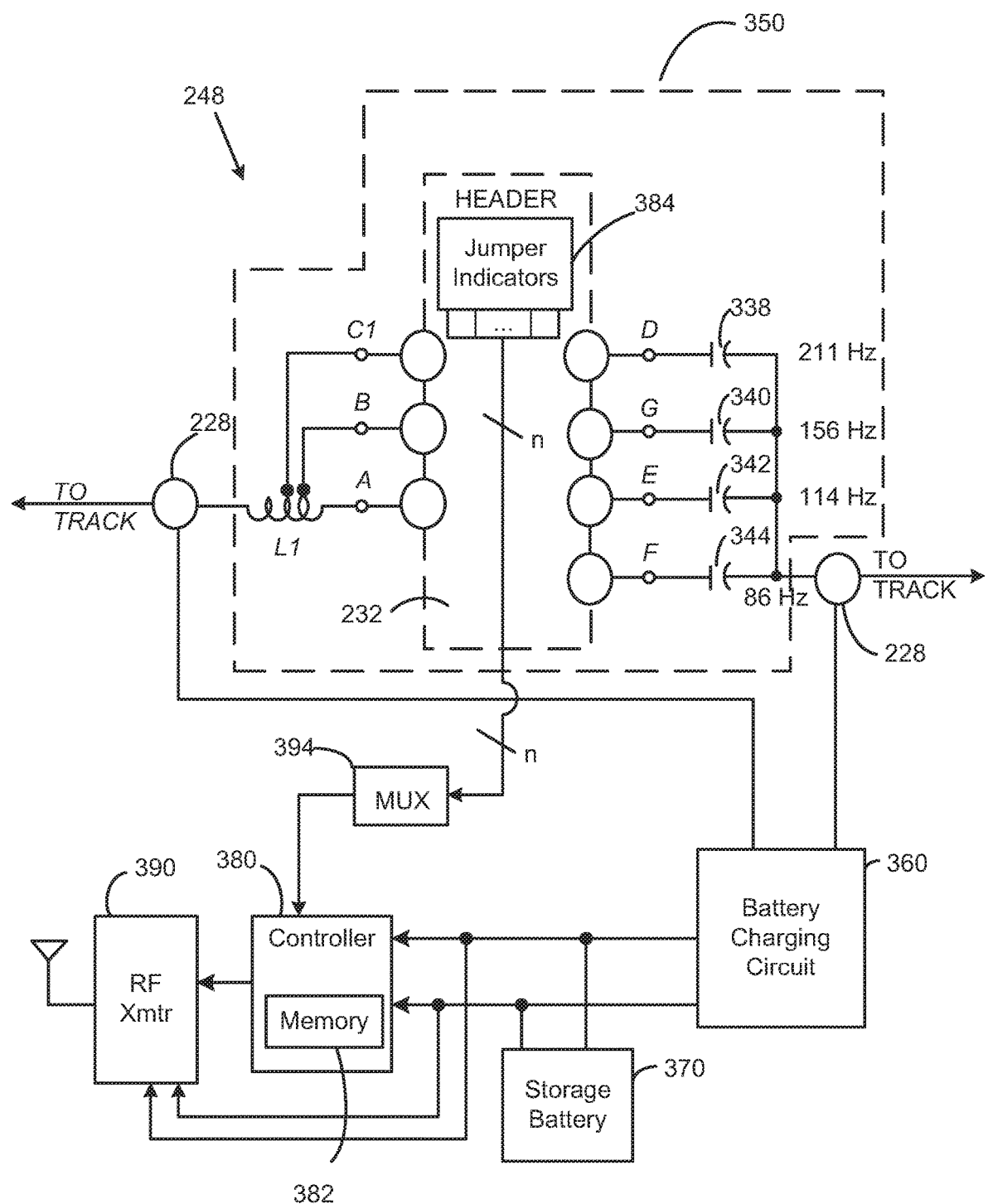
FIG. 3 is a circuit diagram of an embodiment of the shunt of FIG. 2.

FIG. 3 is a schematic diagram of a circuit 300 in shunt 248 according to one embodiment. In FIG. 3, one terminal 228 is connected to coil L1 which has two intermediate taps indicated at B and C1 with the three coil terminals being connected to header terminals designated at A, B, C. The other terminal 228 is connected to the common end of four capacitors indicated at 338, 340, 342 and 344. These capacitors are connected, respectively, to header terminals D, G, E and F. The coil L1 and the capacitors 338, 340, 3421 and 342 together with their respective header terminals form a network 350. The four output frequencies for the circuit of FIG. 3, indicated at the right side of the capacitors, are 86 Hz, 114 Hz, 156 Hz and 211 Hz. To provide an 86 Hz output there will be connections between header terminals A-D; D-G; G-E; and E-F. For an output of 114 Hz there will be connections between header terminals B-D; D-G; and G-E. For an output frequency of 156 Hz there will be connections between header terminals C-D; and D-G. For an output frequency of 211 Hz there is only a connection between terminals C-D.

Those of skill in the art will recognize that the network 350 shown in FIG. 3 is but one possible example. Other networks are also possible, including without limitation the networks shown in FIGS. 4 and 5 of the aforementioned U.S. Pat. No. 5,029,780.

Also connected to terminals 228 is a battery charging circuit 360, which in turn is connected to a storage battery 370, a controller 380 and an RF transmitter 390. The battery charging circuit 360, the controller 380, and the RF transmitter 390 may be located on the printed circuit board 226. The battery charging circuit 360 is powered by the voltage across the track rails 22a,b by the transmitter 43. A typical track circuit, such as those found in the GCP4000 systems available from the assignee, Siemens Corp., the voltage measured across the rails 22a,b may be approximately 3 VAC. The battery charging circuit will be configured for the particular type of storage battery 370. Various types of storage batteries, e.g., lithium ion, nickel-cadmium, etc., as well as charging circuits for such batteries, are known in the art and thus will not be discussed in further detail herein.

The storage battery 370 may provide power to a controller 380. The controller 380 may include a memory 382 for storing a software program to implement the functions discussed herein and for storing identifying information, such as a model number and/or a serial number, for the shunt 248. The memory 382 may comprise volatile or non-volatile random access memory or a combination thereof, and may comprise one or more chips separate from the controller 380 or may be located on the same semiconductor substrate as the controller 380.

Figure 4:
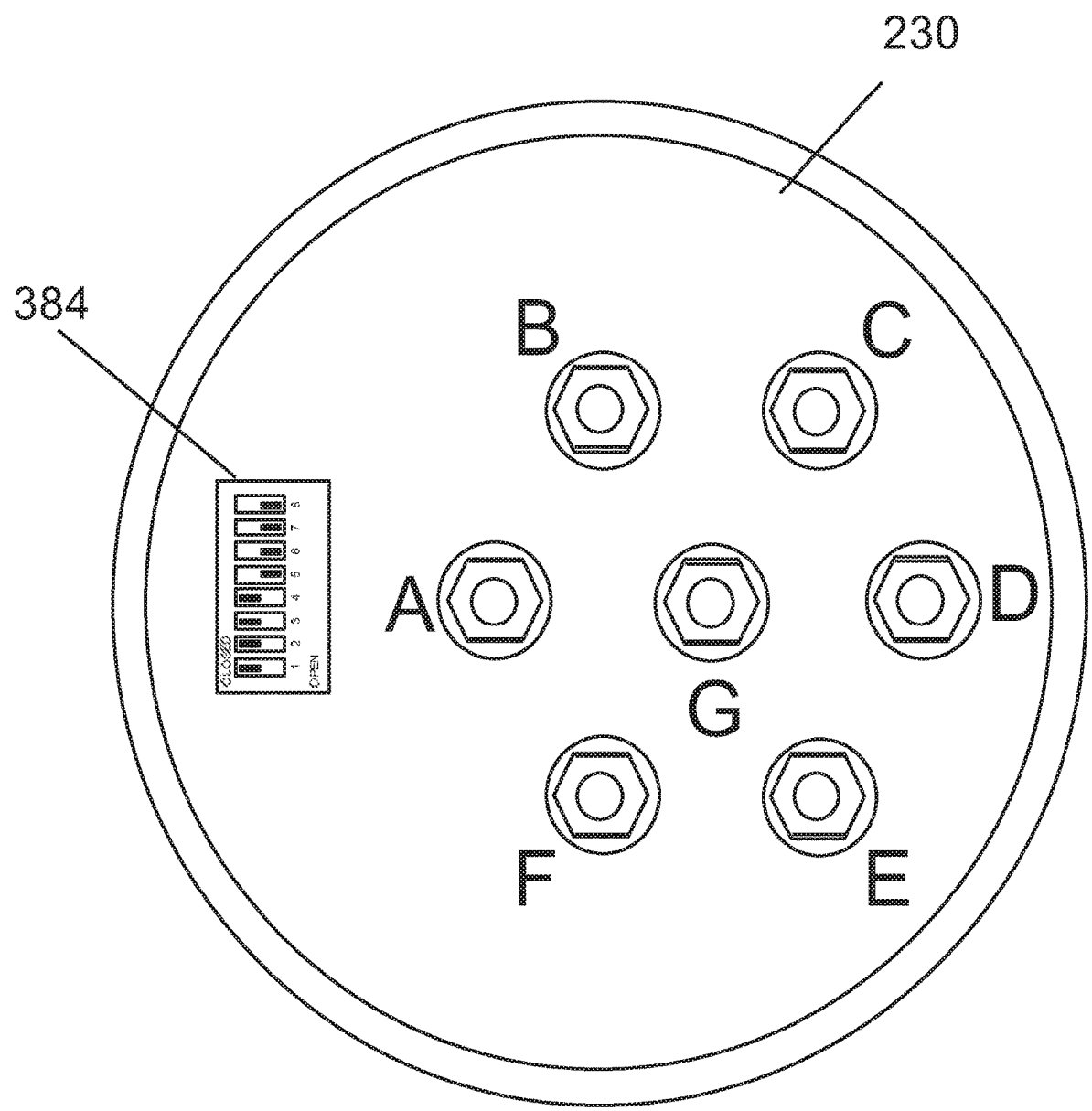
FIG. 4 is a top view of a header of an embodiment of the shunt of FIG. 2.

Also connected to the controller 380 in some embodiments are a plurality of jumper indicators. The jumper indicators indicate to the controller 380 whether jumpers are installed across the various terminals A-G on the header board in order to allow the controller 380 to determine the shunt frequency selected by the installer. In some embodiments, the jumper indicators take the form of a switch bank 384, which may be located on the same side of the header board 232 as terminals A-G and which may be used by the installer to select a code corresponding to the frequency of the shunt selected through the placement of jumpers on the header terminals. In some embodiments, the switch array 384 may be implemented as a bank of DIP switches as shown in FIG. 4 (reference letters A-G designate terminals, which may be standard AREMA (American Railway Engineering and Maintenance-of-Way Association) terminals). In other embodiments, the switch array may be comprised of thumbwheel switches, thumb press switches, or any other type of switch, or even as a collection of jumper pins on which respective jumpers may be placed. The shunt installer may use the switch bank 384 to select a code that corresponds to the jumpers installed on the header terminals 30 to select the desired frequency for the shunt 248.

Figure 5:
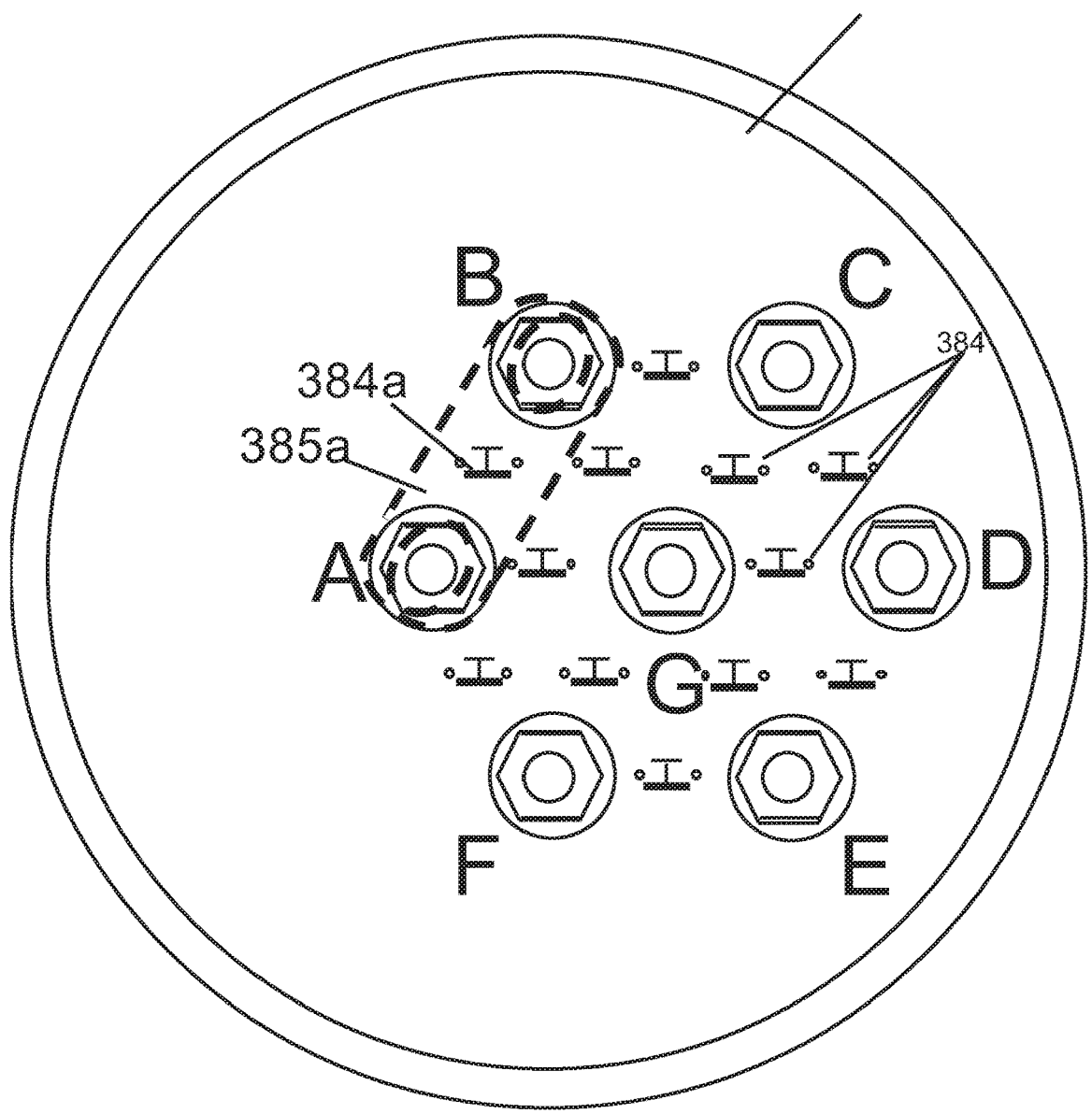
FIG. 5 is a top view of a header of another embodiment of the shunt of FIG. 2.

The embodiment discussed above employing an array of switches that are set by a shunt installer as the jumper indicators is advantageous in that it is simple and relatively inexpensive to manufacture. However, in those embodiments, the shunt installer is relied on to properly set the switches. This leads to the possibility of a shunt installer forgetting to set the switches or setting them incorrectly so that the transmitted code does not match the shunt frequency selected via the configuration of jumpers across the terminals A-G. In other embodiments, rather than the jumper indicators taking the form of switches that are set by a shunt installer, a plurality of switches 384 may be located and positioned on the header board 232 between each pair of adjacent terminals such that a jumper installed across two adjacent terminals, such as the jumper 385a (shown in phantom) installed across terminals A and B, will change the setting of a corresponding switch 384a as shown in FIG. 5. The switches 384 in FIG. 5 may be mechanical normally-closed pushbutton switches which are positioned at a height such that installation of a jumper 385 across the terminals corresponding to a switch 384 will cause that switch to be depressed, thereby moving the switch from the biased, normally closed position to an open position. The switches 384 and the jumpers 385 may be electrically isolated from each other so that the switches do not interfere with the network 350 (not shown in FIG. 5) connected to the terminals A-G. This may be accomplished by insulating the surface of the switches 384 that contact the jumpers 385, by insulating the surface of the jumpers 385 that contact the switches 385, or both. In other embodiments, different switch configurations, such as a normally open pushbutton switch, may be used. The switches may be membrane-type switches in some embodiments.

Regardless of the type of switch selected, the travel of the switch must be chosen to account for different travel distances that can result from multiple jumpers being installed on a single terminal. For example, in FIG. 5 above, a single jumper is installed across terminals A-B. It should be understood that a second jumper may be installed across terminals C-D and B-C. In this case, the jumpers across terminals B-C may be positioned on top of the jumpers across terminals A-B and C-D such that the height of the jumper across terminals B-C is further away from its respective switch (and thus will depress the switch less when installed) relative to the distance between the jumpers across terminals A-B and C-D in an amount equal to the thickness of the jumper (e.g., ⅛ inch). In this example, the jumper across terminals B-C will depress the corresponding switch ⅛ inch less than the jumpers across terminals A-B and C-D. An example of a membrane type, normally open pushbutton switch that allows for different amounts of travel is illustrated in FIGS. 11a-c of U.S. Pat. No. 7,671,846, the contents of which are hereby incorporated herein by reference. In the aforementioned U.S. Pat. No. 7,671,846, the different amounts of travel are used to determine an amount of force exerted on the pushbutton switch. In contrast, the switch of the U.S. Pat. No. 7,671,846 may be utilized in connection with a simple threshold for determining the open/closed position in this embodiment so that the varying distances by which the switches are depressed due to variations in jumper configurations all indicate the presence of a jumper to the controller 380. What is important in these embodiments is that the switch configuration allows for different amounts of travel while still reliably indicating the presence of a jumper, thereby accommodating the possibility that the switch may be depressed by different amounts due to variations in a number of jumpers on respective terminals associated with the switch.

Figure 6:
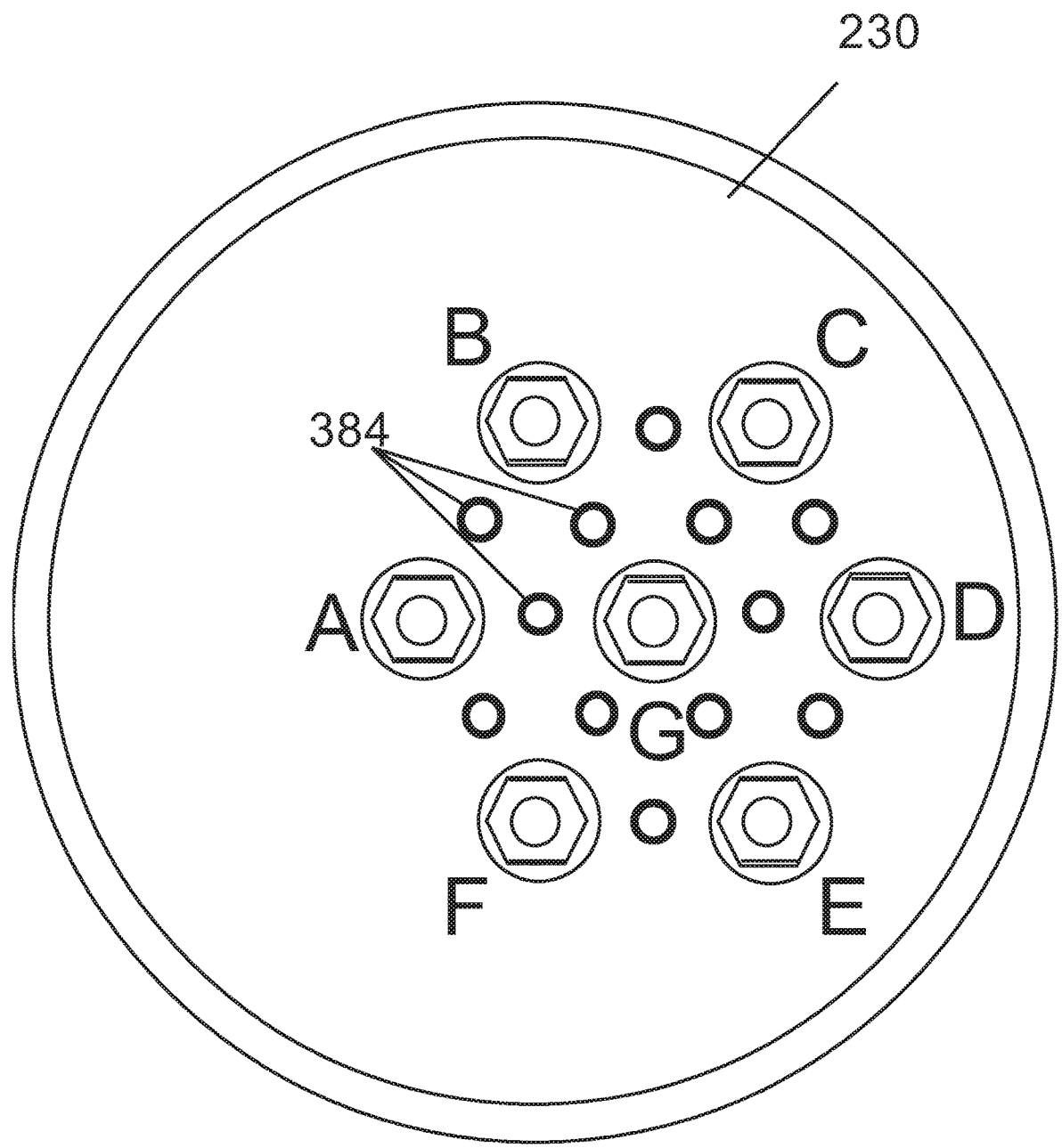
FIG. 6 is a top view of a header of yet another embodiment of the shunt of FIG. 2.

In yet other embodiments, sensors 384 rather than switches may be used to indicate the presence or absence of jumpers 385 across the terminals A-G as shown in FIG. 6. The sensors 384 may be small magnetometers that detect jumpers made from ferromagnetic material in some embodiments, and in other embodiments may be optical sensors that may, for example, detect light reflected off of the surface of an installed jumper with a reflective surface (e.g., an optical transmitter may be positioned adjacent an optical sensor on the header board 232, as illustrated in FIG. 2, at the location of the switches in FIGS. 4 and 5). Still other sensors and configurations may be employed in other embodiments. In still other embodiments, the jumper indicators may take the form of memory cells in the memory 382. The content of the memory cells may be set by a shunt installer using an application program on an installer device such as a laptop or smart phone. In such embodiments, the RF transmitter 390 may be a transceiver that is configured to receive a command from the application program to set the contents of the memory cells to a value corresponding to the configuration of the jumpers on the header board 232.

Referring now back to FIG. 3, in embodiments in which the jumper indicators 384 comprise switches or sensors, additional logic such as a multiplexer 394 connected between the jumper indicators 384 and the controller 380 may be used by the controller 380 to determine the configuration of the jumpers on the header 232. Those of skill in the art will recognize that logic circuits other than the multiplexer 394 may also be used.

The controller 380 may be configured to control the RF transmitter 390 to transmit a code based on information from the jumper indicators 384, and other identifying information such as the model number and/or serial number stored in the memory 382. The transmitter 390 may be a transceiver, and may be configured for any type of RF transmission, including transmissions governed by a standard such as BLUETOOTH or non-standard transmissions. The information transmitted by the RF transmitter 390 may be in encrypted or clear text form.

Figure 7:
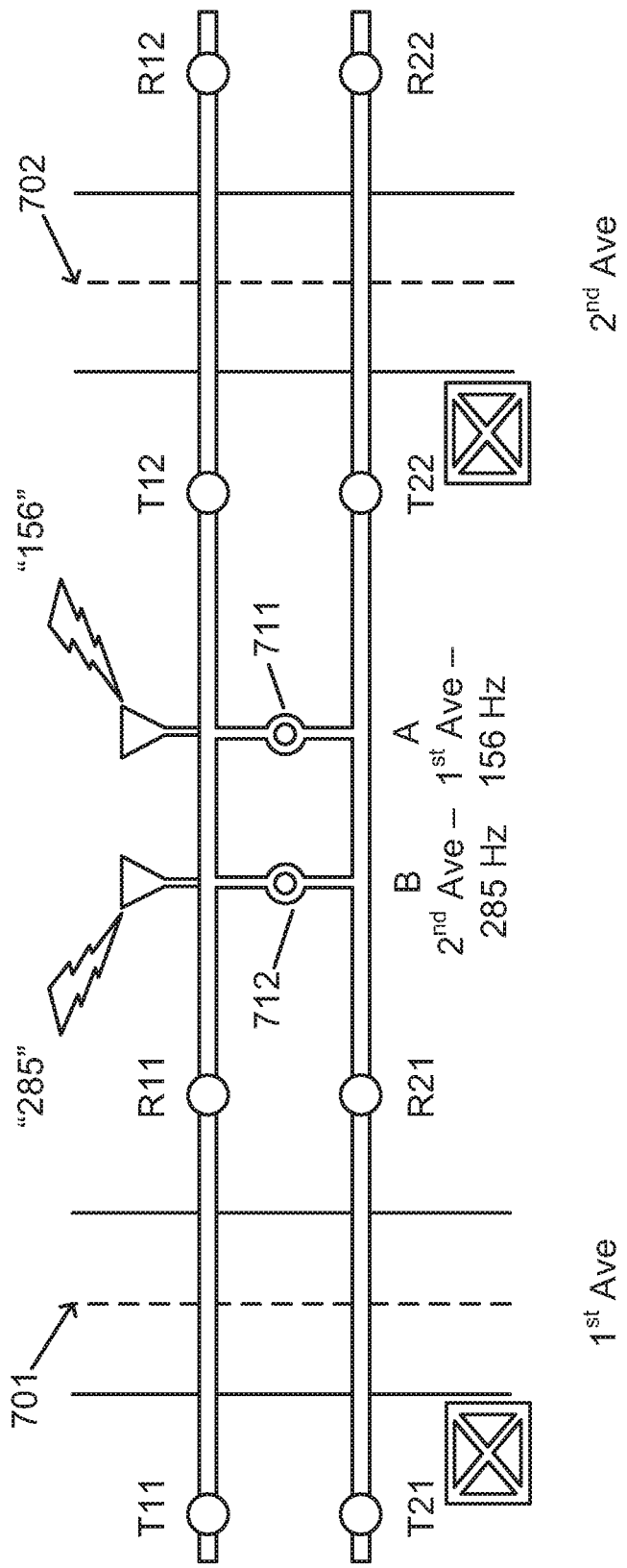
FIG. 7 is a diagram of multiple railroad crossings including multiple shunts of FIG. 2.

The transmissions from the RF transmitter may be used by maintenance personnel or others to locate a shunt of interest. In an exemplary crossing installation shown in FIG. 7, two grade crossings 701 and 702 may be located in close proximity to each other. Those of skill in the art will recognize that some installations may involve more than 2 grade crossings in close proximity. In FIG. 7, transmitters T11 and T21, receivers R11 and R21, and shunt 711 are associated with crossing 701; transmitters T12 and T22, receivers R12 and R22, and shunt 712 are associated with crossing 702. Shunt 711 has been configured for a frequency of 156 Hz and shunt 712 has been configured for a frequency of 285 Hz via configuration of jumpers on the respective header boards 232 of those shunts. The controllers 380 of the shunts 711 and 712 control the respective transmitters 390 to transmit the respective frequency information, which may take the form of an encrypted or unencrypted code. A portable device, such as a laptop, a tablet or a smartphone, may be configured with a receiver (which may be a transceiver) configured for receiving the transmissions from the shunts (e.g., BLUETOOTH transmissions) and to display the received signal strengths of those transmissions along with the frequencies and any other information transmitted by the shunts. In some embodiments in which the shunt 248 does not transmit information until it receives a command, the transceiver of the portable device may be controlled by the person operating it to transmit a query to the shunt 248 to cause the shunt 248 to begin periodically transmitting its information for some predetermined period of time (e.g., once every 10 seconds for 5 minutes). The signal strength may be displayed in absolute or relative (e.g., received signal strength indication, or RSSI, often made available by a receiver chipset) form. Maintenance personnel using the portable device can walk along the tracks and determine, using the information displayed by the portable device, the location at which the received signal strength for the shunt of interest (e.g., the signal strength associated with the frequency of the shunt) is the highest, which indicates the location of the shunt. For example, in FIG. 7, the received signal strength for shunt 711 will be the highest at position A along the track, and the received signal strength for the shunt 712 will be the highest at position B along the track. Maintenance personnel can then start clearing any snow, mud, ballast or other debris away from the track at the location of the highest signal strength for the shunt of interest in order to spot the connection of that shunt to the track to further narrow the location of the shunt.

Figure 8:
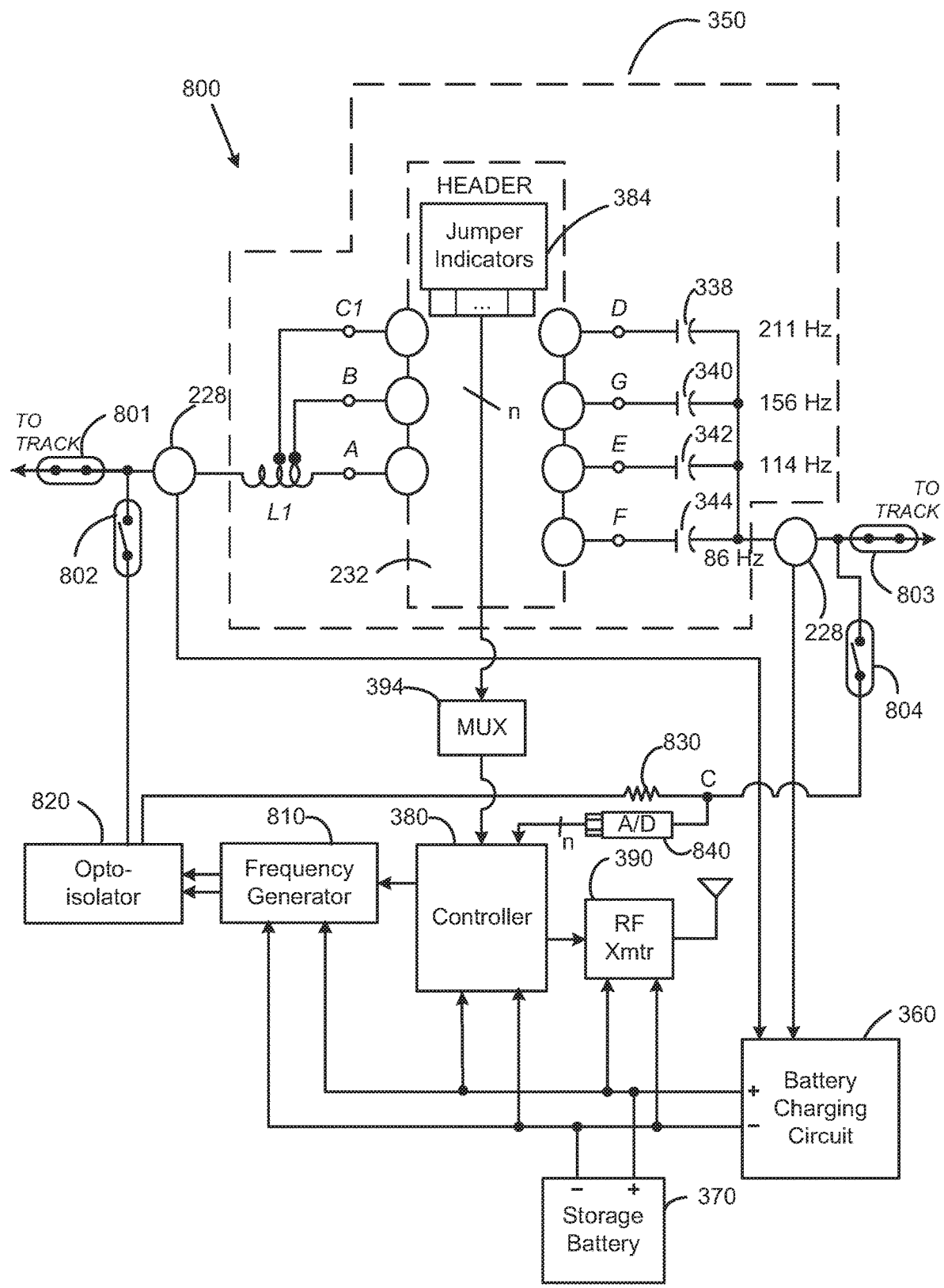
FIG. 8 is a circuit diagram of another embodiment of the shunt of FIG. 2.

As discussed above, because components in the shunts and components in the other devices in the track circuit sometimes fail, it sometimes becomes necessary or desirable to test the shunt to determine if it is properly shunting (i.e., passing) the desired frequency at a sufficiently low level of attenuation. FIG. 8 is a diagram of a circuit 800 similar to circuit 300 of FIG. 3, but including additional components that may be used to perform such testing in another embodiment. The circuit 800 may include four reed switches 801, 802, 803, 804. Together, the reed switches 801-804 may function to isolate the network 350 from the track and connect it to the test circuit portion of FIG. 8 so that a test signal may be input to the shunt 248 and the output of the shunt 248 may be analyzed as explained further below. Two of the reed switches 801, 803 are normally closed switches that may connect the network 350 to the rails when no strong magnetic force is in the vicinity of the shunt 248. The other two reed switches 802, 804 are normally open switches that may isolate the network 350 from the test circuit portion of FIG. 8 in the absence of a strong magnetic force in the vicinity of the shunt 248. When a test of the shunt 248 is desired, a maintenance worker may place a magnet of sufficient strength to modify the positions of reed switches 801-804 so that the normally closed reed switches 801, 803 are in the open position, thereby isolating the network 350 from the track, and the normally open reed switches 802, 804 are in the closed position, thereby connecting the network 350 to the test circuit portion (as will be described below) of FIG. 8. In some embodiments, each pair of switches connected to the same terminal of the network 360 (e.g., switches 801 and 803) may be replaced by a single double-throw reed switch. In yet other embodiments, all four reed switches 801-804 may be replaced by a double-pole, double-throw reed switch.

The circuit 800 may include a test circuit portion that may include a frequency generator 810 that may be controlled by the controller 380. The frequency generator 810 may be a digitally controlled voltage controlled oscillator, or a numerically controlled oscillator. The controller 380 may cause the frequency generator 810 to generate a signal (e.g., a sinusoidal signal) with a frequency that may be equal to the nominal tuned frequency value of the shunt 248. The signal output by the frequency generator 810 may be supplied to an opto-isolator 820 that serves to electrically isolate the frequency generator 810 from the network 350. The opto-isolator 820 may be a 4N35SR2M opto-isolator available from On Semiconductor in some embodiments. One output of the opto-isolator 820 is connected to a precision resistor 830, which is connected to the switch 804. The other output of the opto-isolator 820 is connected to the switch 802. An A/D converter 840 samples the signal at a point C between the precision resistor 830 and the network 350. The controller 380 controls the sampling rate so that a sufficient number of samples are taken by the A/D converter 840 given the frequency generated by the frequency generator 810. The controller 380 may use the samples from the A/D converter 840 to determine a parameter, such as voltage or attenuation, indicative of the performance of the network 350.

In operation, when a test of the shunt 248 becomes necessary or desirable, a worker may place a magnet near the shunt to cause the reed switches 801-804 to be placed into the test mode position with the network 350 isolated from the track and connected to the test circuit as discussed above. The worker may then utilize a portable device (not shown in FIG. 8), which may be the same portable device discussed above configured with a transceiver, to trigger a shunt test by transmitting a test command once the shunt is located as described above. In response to receipt of the test command from the portable device at the controller 380, the controller 380 may cause the frequency generator 810 to begin generating a test signal at the nominal frequency of the shunt 248 (which may be determined via the jumper indicators 384 as discussed above) and may further cause the A/D converter 840 to sample the resulting signal at the point A as discussed above. Once a sufficient number of samples have been collected, the controller 380 may then control the A/D converter 840 to stop sampling, and may control the frequency generator 810 to stop generating the test signal. The controller 380 may then analyze the samples to determine the parameter (e.g., the voltage or attenuation) and compare the parameter to a predetermined pass/fail threshold. The controller 380 may then transmit an indication of the comparison (e.g., a pass or fail indication) to the portable device. In other embodiments, the parameter itself may be transmitted to and displayed on the portable device, either in addition to or in place of the pass/fail indication.

In some embodiments, the portable device include an option to specify a particular frequency of a test signal for testing the shunt 248. In such embodiments, the portable device may transmit a test command to the shunt with the specified frequency, and the controller 380 may control the frequency generator to generate a test signal with the specified frequency. The samples from the A/D converter 840 may then be analyzed by the controller 380 and a parameter may be transmitted via the transceiver 390 at the shunt 248 to the portable device for display to the operator. The ability to specify a test signal frequency allows an operator not only to confirm that the shunt is passing a signal at the nominal frequency for which the shunt 248 is configured (via placement of the jumpers 385), but also properly rejecting (attenuating) signals at other frequencies.

The controller circuit disclosed herein can be implemented in digital electronic circuitry, or in computer software, firmware, hardware, or in combinations of one or more of them. The logical operations described herein can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor (including, but not limited to microprocessors and microcontrollers), a computer, multiple processors or computers, or special purpose logic circuitry. The data processing apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic operations described in this document can be performed by one or more programmable processors executing one or more computer programs to perform functions by operating on input data and generating output. Processors suitable for the execution of a computer program include, by way of example, both general and special purpose microprocessors and microcontrollers, digital signal processors, and any one or more processors of any kind of digital computer. The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A shunt comprising:
a pair of terminals for connecting to rails of a train track,
a network comprising at least one inductor and a plurality of capacitors, the network being configurable to a desired frequency,
a radio frequency transmitter configured to wirelessly transmit an identifier of the shunt,
a controller, and
a plurality of jumper indicators connected to the controller,
wherein the desired frequency is configured by placing one or more jumpers across terminals of the network, and
wherein the controller is configured to determine a configuration of the one or more jumpers from the plurality of jumper indicators and to control the radio frequency transmitter to wirelessly transmit information indicative of the desired frequency based on the configuration of the one or more jumpers,
wherein the plurality of jumper indicators comprises a plurality of sensors, each sensor being positioned between respective terminals of the network and configured to detect a presence or an absence of a jumper across the respective terminals of the network, and
wherein the plurality of sensors are magnetometers and wherein the plurality of jumper indicators comprises a ferromagnetic material.

2. The shunt of claim 1,
wherein the plurality of jumper indicators comprises a plurality of memory cells configurable by a shunt installer.

3. The shunt of claim 1, further comprising:
a frequency generator connected to the controller and configurable to generate a test signal, an output of the frequency generator being connectable to the network,
a resistor connectable to the network, and
an analog to digital converter connected to the resistor,
wherein the controller is configured to analyze samples from the analog to digital converter to determine a parameter and output the parameter to a portable device.

4. The shunt of claim 3, further comprising:
a first reed switch connected between a first input of the network and a first rail of the train track, and
a second reed switch connected between a second input of the network and a second rail of the train track, the first and second reed switches being configured to isolate the network from the first and second rails of the train track in the presence of a magnetic field.

5. The shunt of claim 3, further comprising:
a first reed switch connected to a first input of the network and a second reed switch connected to a second input of the network, the first and second reed switches being configured to couple an output of the function generator to the network in the presence of a magnetic field.

6. The shunt of claim 3, further comprising:
an opto-isolator connected between an output of the frequency generator and the network.

7. The shunt of claim 1,
wherein the identifier is a serial number or a model number.

8. The shunt of claim 1, further comprising:
a storage battery connected to power the radio frequency transmitter, and
a charging circuit connected to draw power from the pair of terminals and configured to charge the storage battery.

9. The shunt of claim 1,
wherein the plurality of jumper indicators comprises a plurality of switches configurable by an installer.

10. The shunt of claim 1,
wherein the plurality of jumper indicators comprises a plurality of switches positioned between respective terminals of the network such that a setting of each switch is determined by a presence or an absence of a jumper across the respective terminals of the switch.

11. A method for locating a shunt along a railroad track, the method comprising:

moving a device between multiple locations along a train track, receiving, at the device, a transmission from at least one shunt at each of the multiple locations, each transmission comprising at least a frequency for which the shunt is configured, displaying, on the device, a signal strength of each transmission along with the frequency of the shunt received in the transmission, wherein a highest received signal strength for the frequency of the shunt indicates the location of the shunt with that frequency.

12. The method of claim 11, wherein the signal strength is a relative received signal strength.

13. The method of claim 11, wherein the signal strength is an absolute signal strength.

14. The method of claim 11, wherein each transmission from a shunt includes additional information identifying the shunt, and wherein the additional information is displayed along with the frequency.

15. The method of claim 11, further comprising:

receiving at the shunt a command from the device to test the shunt, generating, by the shunt, a test frequency and applying the test frequency to the network, obtaining samples of a signal output from the network, determining using the samples a parameter indicating a performance of the shunt, and outputting a signal to the device, the signal being based on the parameter.

16. The method of claim 15, wherein the test frequency is the frequency for which the shunt is configured.

17. The method of claim 15, wherein the test frequency is specified using the device.

* * * * *